(12) United States Patent
Waddell

(10) Patent No.: US 10,836,362 B2
(45) Date of Patent: Nov. 17, 2020

(54) DUAL CHOCKING DEVICE

(71) Applicant: James Barry Waddell, Frankfort, KY (US)

(72) Inventor: James Barry Waddell, Frankfort, KY (US)

( * ) Notice: Subject to any disclaimer, the term of this patent is extended or adjusted under 35 U.S.C. 154(b) by 62 days.

(21) Appl. No.: 16/234,004

(22) Filed: Dec. 27, 2018

(65) Prior Publication Data

US 2019/0202418 A1    Jul. 4, 2019

Related U.S. Application Data

(60) Provisional application No. 62/611,016, filed on Dec. 28, 2017.

(51) Int. Cl.
*B60T 3/00* (2006.01)

(52) U.S. Cl.
CPC ...................... *B60T 3/00* (2013.01)

(58) Field of Classification Search
CPC ........................................... B60T 3/00
USPC ........................................... 188/4 R
See application file for complete search history.

(56) References Cited

U.S. PATENT DOCUMENTS

| | | | | |
|---|---|---|---|---|
| 2,720,285 A * | 10/1955 | Taylor | ........... | B60T 3/00 188/32 |
| 3,120,292 A * | 2/1964 | Rambat | ........... | B60T 3/00 188/32 |
| 3,625,313 A * | 12/1971 | Lowrie | ........... | B60T 3/00 188/4 R |
| 6,336,527 B1 * | 1/2002 | Metz | ........... | B60T 3/00 188/32 |
| 6,378,956 B1 * | 4/2002 | Van De Walker | ........ | B60T 3/00 188/32 |
| 6,390,245 B1 * | 5/2002 | Metz | ........... | B60T 3/00 188/32 |
| D609,158 S * | 2/2010 | Bird | ........... | D12/217 |
| 7,753,177 B2 * | 7/2010 | Slager | ........... | B60T 3/00 188/36 |
| 8,499,899 B2 * | 8/2013 | Scott | ........... | B60T 3/00 188/32 |
| 9,108,657 B2 * | 8/2015 | Hussain | ........... | B62B 5/0442 |
| D772,775 S * | 11/2016 | Bird | ........... | D12/223 |
| D873,196 S * | 1/2020 | Harrington | ........... | D12/217 |
| 2004/0045774 A1 * | 3/2004 | D'Alessio | ........... | B60T 3/00 188/4 R |
| 2011/0100765 A1 * | 5/2011 | Bird | ........... | B60T 3/00 188/32 |

* cited by examiner

*Primary Examiner* — Thomas W Irvin
(74) *Attorney, Agent, or Firm* — Stockwell & Smedley, PSC

(57) ABSTRACT

An improved wheel chock system for preventing excessive movement of tires, wheels, and other rollable objects, having two cooperating members connected via a connector permitting pivotal movement by at least one of the cooperating members about the connector. The cooperating members each have a handle at their one end for actuating wheel chocks retained at their other end throughout a range between a fully open condition where the wheel chocks are spaced away from each other, and a fully closed condition where the wheel chocks are spaced adjacent to one another.

17 Claims, 10 Drawing Sheets ically U.S. patent application 62/611,016 are incorporated herein by reference for all purposes.

DUAL CHOCKING DEVICE

CROSS-REFERENCE TO RELATED APPLICATIONS

This application is a non-provisional U.S. patent application claiming the benefit of priority to provisional U.S. patent application 62/611,016 entitled "EZ-R Chock" filed on Dec. 28, 2017. The entire contents and disclosures of provisional U.S. patent application 62/611,016 are incorporated herein by reference for all purposes.

BACKGROUND OF THE INVENTION

The invention relates generally to wheel chocks for preventing excessive movement of wheels, tires, and other rollable objects, and more specifically, a supported dual chock system for engaging and disengaging opposing sides of one or more rollable objects.

Preventing a wheel, tire, or other rollable object, usually on the base portion of a transport vehicle/container, from moving and/or rolling excessively is vitally important in certain circumstances, particularly for purposes of stability, personnel safety, transport vehicle/container preservation, and nearby property preservation. Such circumstances can include temporary periods such as parking, maintenance, storage, or vehicle/container transfer. Various chock systems exist including (often triangular prisms) chocks incorporating or coated with high-friction coefficient material ensuring face interchangeability with limited movement of the chock after engaging any face to a work surface adjacent to the rounded side of a rollable object.

Chocks often come in connected pairs to help ensure usage on both sides of a rollable object. Often both chocks of a pair of chocks are connected by a rope, chain, or other flexible connector, with the flexible connection being long enough to ensure placement of one chock on each rounded side near the bottom of the rollable object. However, during movement, the chock pair is usually lifted or dragged, often by the flexible connector. This lifting/dragging can be strenuous, particularly for heavy chocks; or detrimental to the materials of the flexible connection or chock; and incorporating or coating chocks with high-friction coefficient material can result in expenses as well as replacement costs for damaged chocks or associated flexible connectors.

A general object of the present invention is to overcome some of the drawbacks and problems associated with other chock systems, among other things.

SUMMARY OF THE INVENTION

The invention is generally directed to wheel chock systems and chocking devices which, among other things, solve the issues cited above and other issues in the relevant art.

Some embodiments of the invention are directed to a wheel chock system, comprising: first and second cooperating members each having a first and second end; means for connecting the first and second cooperating members at a connection point disposed between the first and second ends of each of the first and second cooperating members for permitting at least one of the first or second cooperating members to pivotally move about the connection point, throughout a range between a completely open position where the second ends of the first and second cooperating members are spaced from each other, and a completely closed position where the second ends of the first and second cooperating members are significantly closer to one another; first and second wheel chocks; and first and second means to retain said first and second wheel chocks respectively adjacent to the second ends of the first and second cooperating members respectively.

In some embodiments, the aforementioned system further includes first means for support fastened to the second end of one of the first cooperating members, said first means for support movably engageable with a work surface.

In some embodiments, the aforementioned system further includes second means for support fastened to the second end of the second cooperating member, said second means for support movably engageable with a work surface simultaneously with said first means for support.

In some embodiments, the aforementioned system further includes third means for support fastened to the second end of the first cooperating member, said third means for support movably engageable with a work surface; and fourth means for support fastened to the second end of the second cooperating member, said fourth means for support movably engageable with a work surface simultaneously with said third means for support.

In some embodiments of the aforementioned system, the first and second means for support movably engageable with a work surface are engageable with the work surface at a range of positions between the completely open position and completely closed position that differs from the range of positions wherein the third and fourth means for support are engageable with the work surface.

In some embodiments of the aforementioned system, at least one of the first, second, third, and/or fourth means for support comprises a wheel.

In some embodiments, the aforementioned system further includes first and second handles on the first ends of first and second cooperating members respectively.

In some embodiments of the aforementioned system, the first and second handles are integral with first ends of first and second cooperating members respectively.

In some embodiments of the aforementioned system, the first and second means to retain comprises: first and second shanks joined to the second ends of first and second cooperating members respectively, said first and second shanks engageable to first and second cavities respectively as defined by first and second wheel chocks respectively. In some embodiments, both first and second means to retain further comprise at least one cotter pin.

In some embodiments, the first and second shanks are integral with the second ends of first and second cooperating member respectively.

In some embodiments, at least one of the first or second wheel chocks are detachably from their means to retain.

In some embodiments of the aforementioned system, the means for connecting comprises: overlapping at least first and second protrusions integral with first and second cooperating member respectively, said at least first and second protrusions defining first and second eyelets respectively; and a connector receivable by first and second eyelets.

Some embodiments of the invention are directed to a method of using a wheel chock system, comprising the steps of: connecting first and second cooperating members each having a first and second ends via a connector permitting at least one of the first and second cooperating members to pivotally move about the connection point; engaging first and second wheel chocks to first and second shanks respectively at second ends of first and second cooperating members; placing the wheel chock system to dispose the first and second wheel chock proximal to opposing rounded sides of a rollable object; actuating first and second handles on first ends of first and second cooperating members respectively so as to close second ends of respective first and second cooperating members thereby bringing the second ends closer together while engaging opposing rounded sides of the rollable object; and re-actuating first and second handles so as to open second ends of respective first and second cooperating members thereby disengaging the opposing rounded sides of the rollable object. In some embodiments, the step of placing the wheel chock comprises using a rolling means.

In some embodiments, the method further includes the step of tilting the wheel chock system relative to a work surface until the wheel chock system is substantially supported by the rolling means thereby raising the first and second wheel chocks off a work surface; and untilting the wheel chock system thereby lowering the first and second wheel chocks onto said work surface.

Some embodiments of the invention are directed to a first arm and a second arm, the first arm and the second arm each having a lower end and an upper end coupled for pivotal motion relative to one another at a coupling position between the lower end and the upper end, whereby the arms are pivotally movable in and between an open condition and a closed condition; a first shank and a second shank extending transversely from the lower end of the first and the second arms, respectively, the first and second shanks including a non-permanent chock engagement; a first wheel assembly and a second wheel assembly respectively connected to the first and second arms between each respective lower end and the coupling position, wherein each of the first and second wheel assembly includes an inner wheel and an outer wheel mounted laterally on an axle, wherein the mounting on the axle enables one or both the inner wheel and the outer wheel to contact a surface when the arms are in and between the open condition and the closed condition; and at least one chock body having a bore for receiving one of the first and the second shank therein, the chock body having a triangular cross-section.

In some embodiments, the aforementioned chocking device further includes a first handle and a second handle defined on the upper ends of the first and second arms, respectively.

In some embodiments, the aforementioned chocking device further includes a contact surface extending transversely from the arm between the wheel set and the coupling position.

BRIEF DESCRIPTION OF THE DRAWINGS

Other objects and aspects according to the present disclosure will become apparent from the following descriptions of the invention and its embodiments with reference to the accompanying drawings in which.

DETAILED DESCRIPTION OF THE INVENTION

Figure 1:
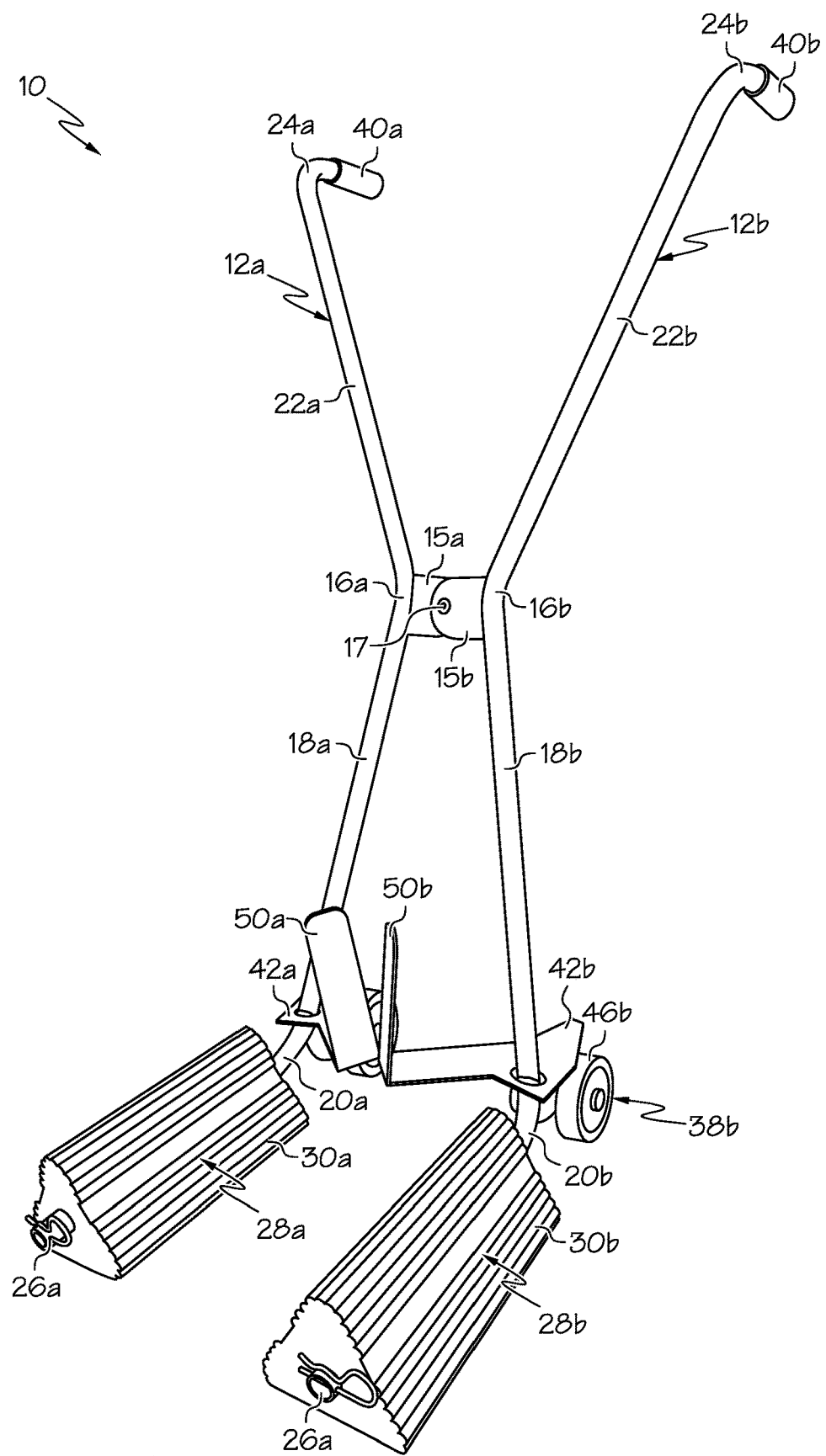
FIG. 1 is a front perspective view of a chocking device according to one embodiment of the invention with the device being in the closed condition.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, such terms are not restricted to physical or mechanical connections or couplings. Unless otherwise apparent, or stated, directional references, such as "inner," "outer," "upper," "lower," "upward," "downwards," "inward," "outward," etc., or variations thereof, are intended to be relative to the parts described or orientation of a particular embodiment of the disclosure as shown in the first view of that embodiment.

The following description is presented to enable a person skilled in the art to understand, make and use embodiments of the disclosure. Various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosure. Skilled artisans will recognize the examples provided herein have many useful alternatives and fall within the scope of embodiments of the disclosure.

Some embodiments of the invention are directed to a dual chock system that includes two pivotally joined cooperating members with a handle on each first end of each cooperating members for actuating the second end of each joined cooperating member, each of said second ends having an associated chock. Actuation can result in a wide range of positions for the associated chocks—ranging from a fully open condition assuring the wheel chocks are spaced wide enough to be moved into a position spaced from opposing rounded sides of a rollable object, such as a tire, to a fully closed condition sufficient to ensure the chocks are close enough to opposing rounded sides of two adjacent rollable objects, such as adjacent tires on a multi-axle trailer, to prevent excessive movement, or for other reasons, such as for a compact configuration for storage.

In some embodiments, the handles are integral with each of the first ends of the cooperating members; while the chocks are attached via engagement with shanks integral with the second ends of the cooperating members. In some embodiments, when the system is nonengaged and at rest, the first and second cooperating members generally lying in a plane perpendicular to a work surface; while both handles, and both shanks with associated chocks, are oriented within two planes, each generally parallel to the work surface.

In some embodiments, the chock system is tiltable onto one or two support means attached near each second end, preferably an inner and an outer set of wheels that can engage the work surface, preferably in different ranges of actuatable positions for the chocks while the chock system is being move and or engaged/disengaged from opposing rounded sides near the bottom of a rollable object.

In some embodiments, each chock is retained to its associated shanks by means including a cotter pin. The mounted chocks may be detachable and reattachable to provide more flexibility in their usage.

Figure 2:
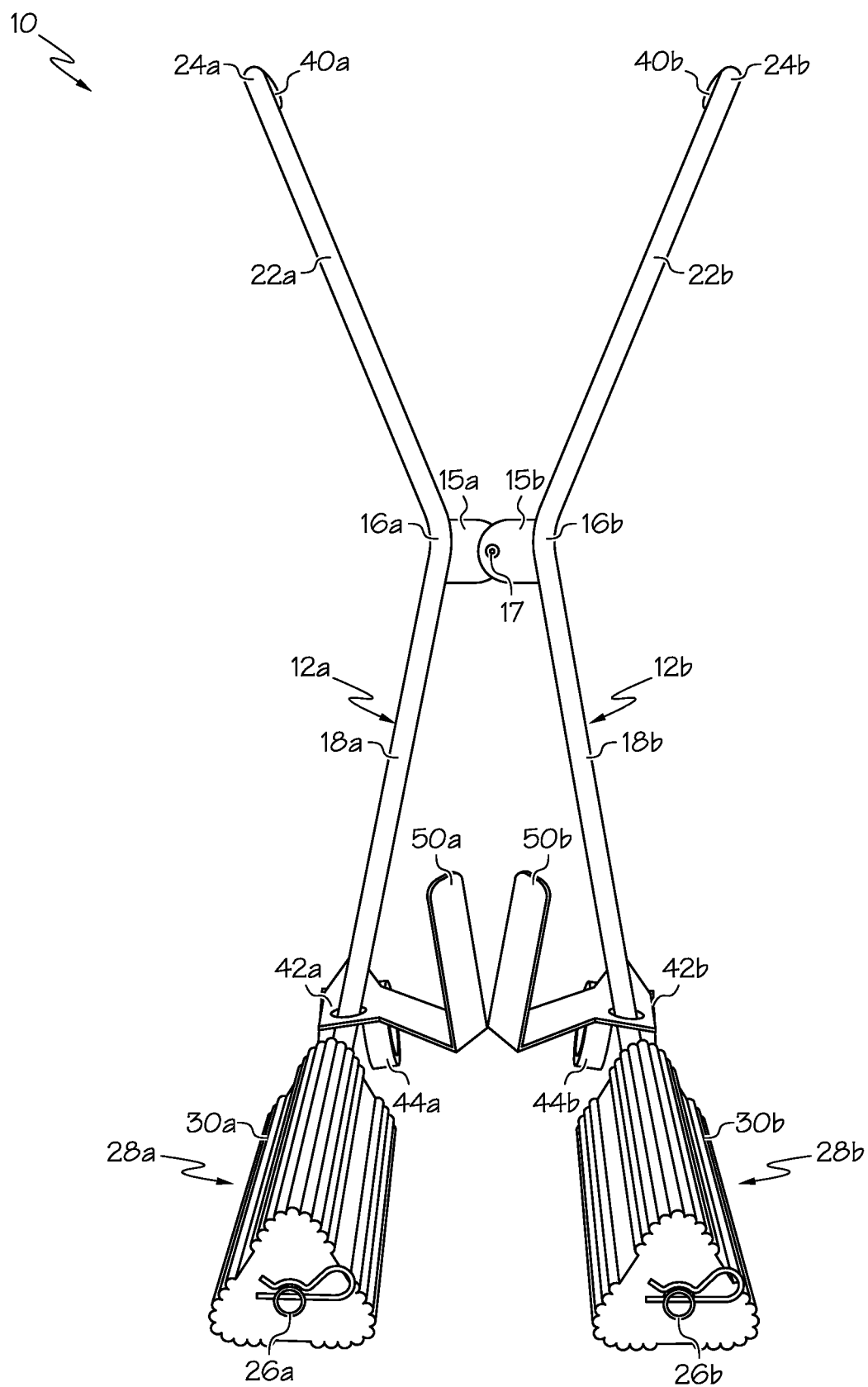
FIG. 2 is a front view of the chocking device of FIG. 1.
Figure 3:
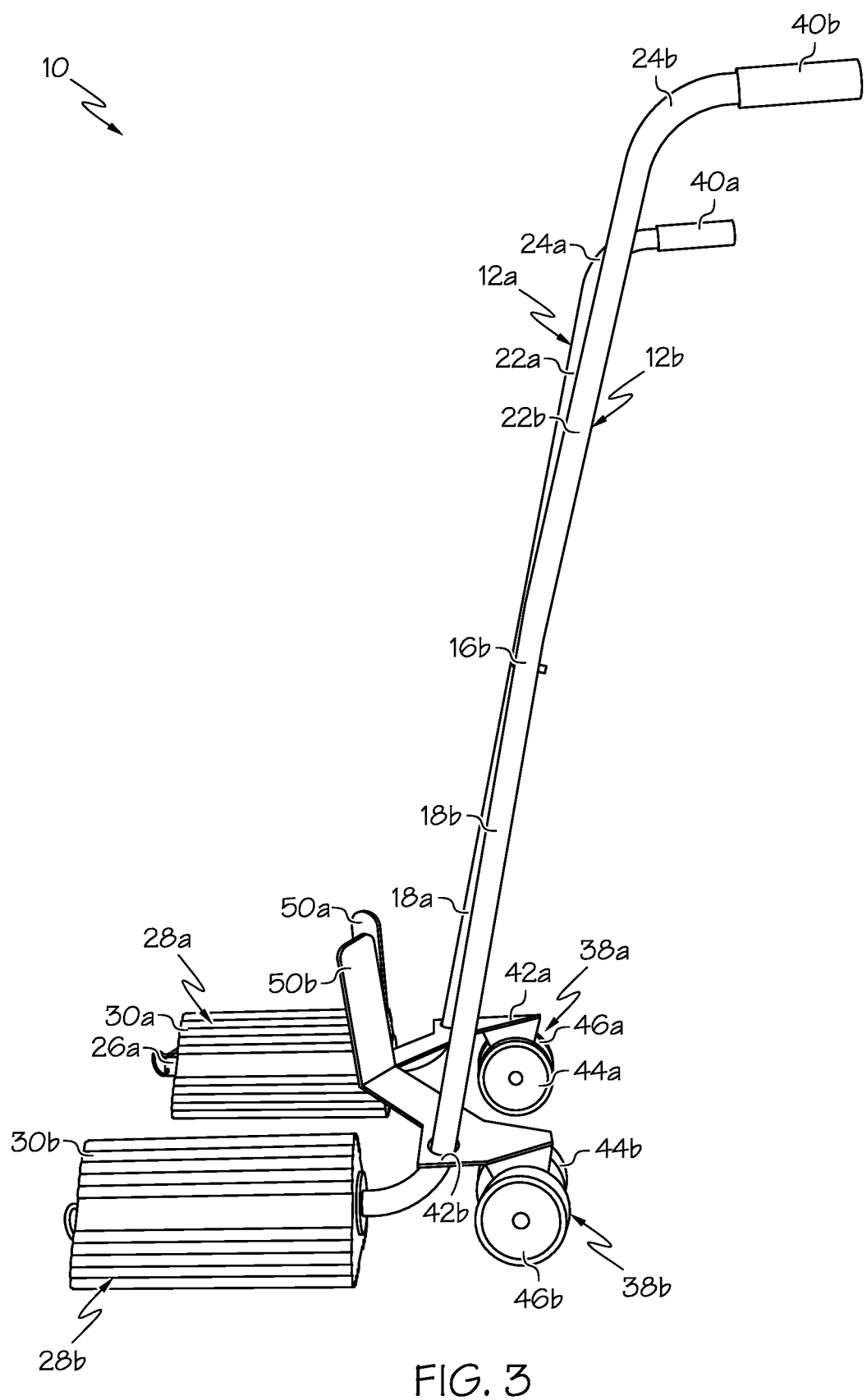
FIG. 3 is a side view of the chocking device of FIG. 1.
Figure 4:
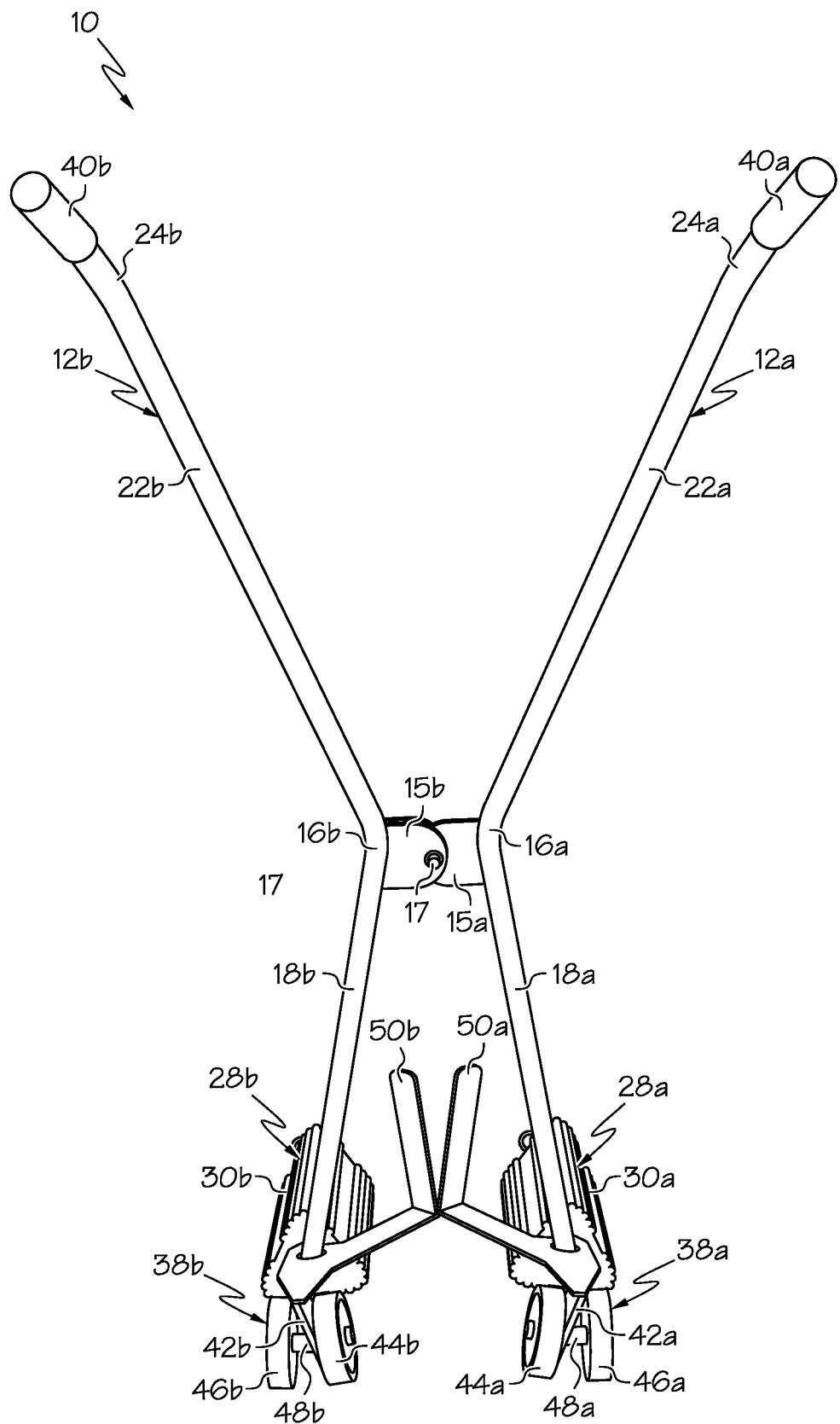
FIG. 4 is a rear view of the chocking device of FIG. 1.
Figure 5:
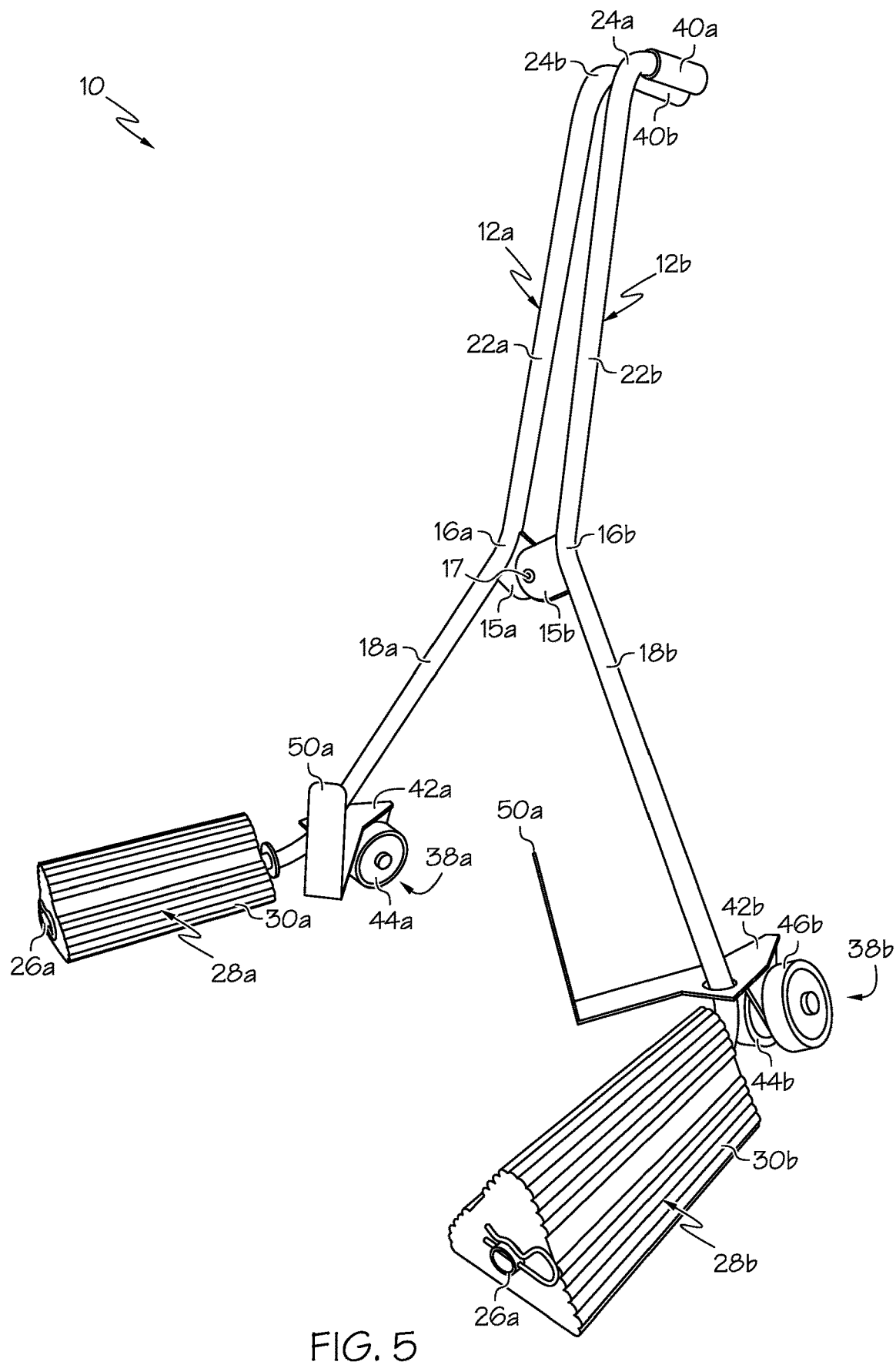
FIG. 5 is another front perspective view of the chocking device of FIG. 1, illustrating the device in the open condition, among other things.
Figure 6:
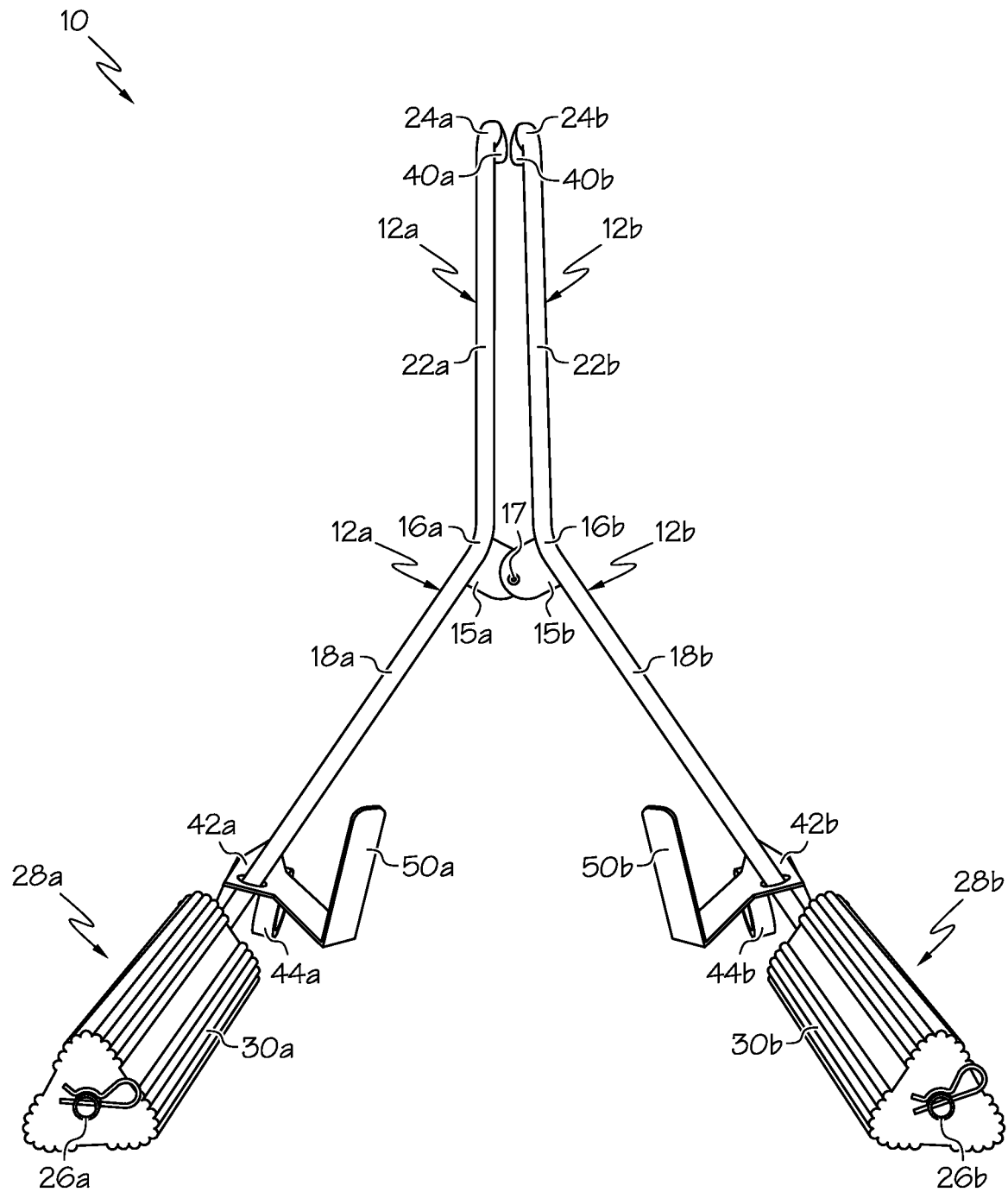
FIG. 6 is a front view of the chocking device of FIG. 1 with the device being in the open condition.
Figure 7:
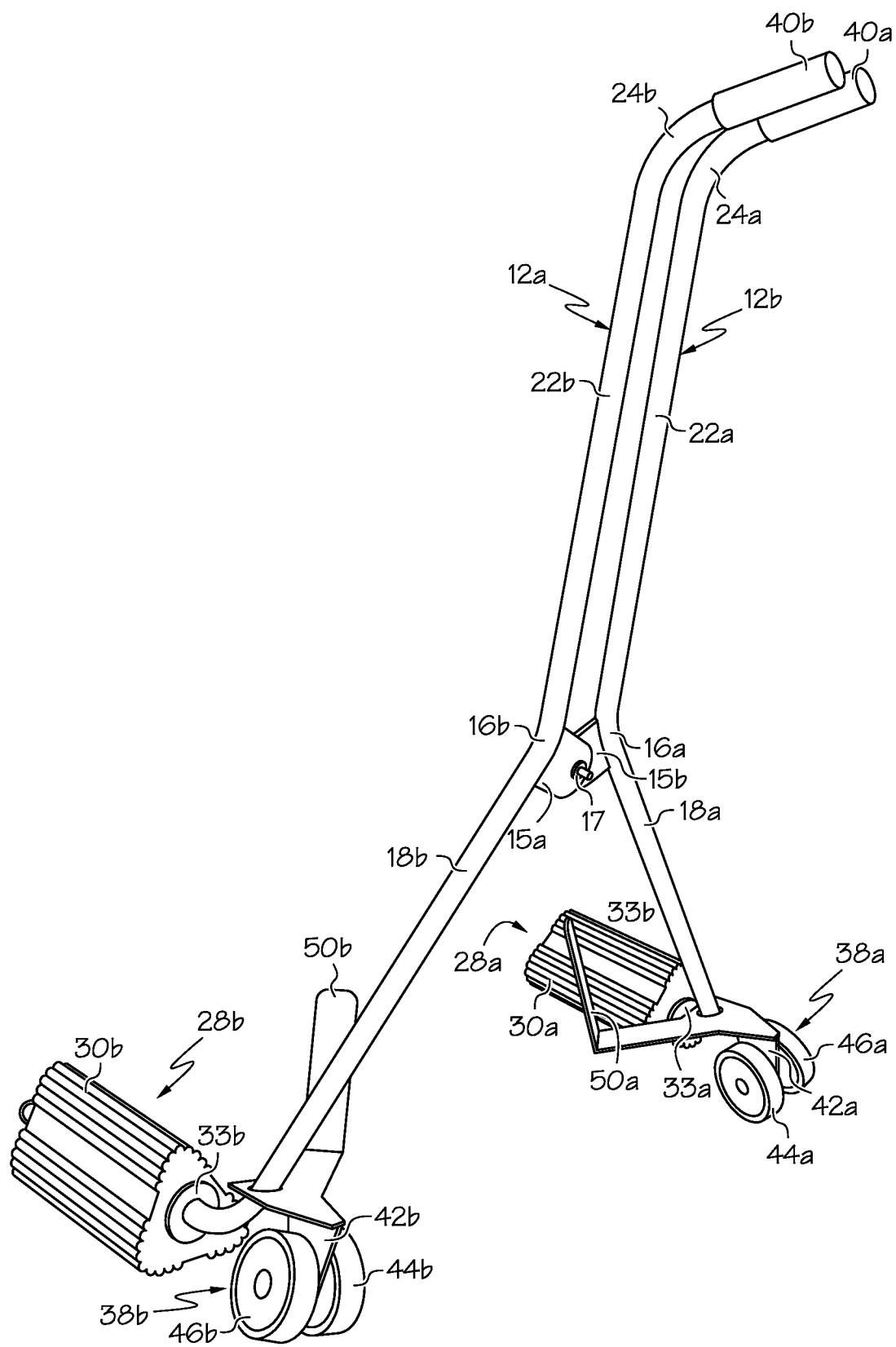
FIG. 7 is a rear perspective view of the chocking device of FIG. 1 with the device being in the open condition.
Figure 8:
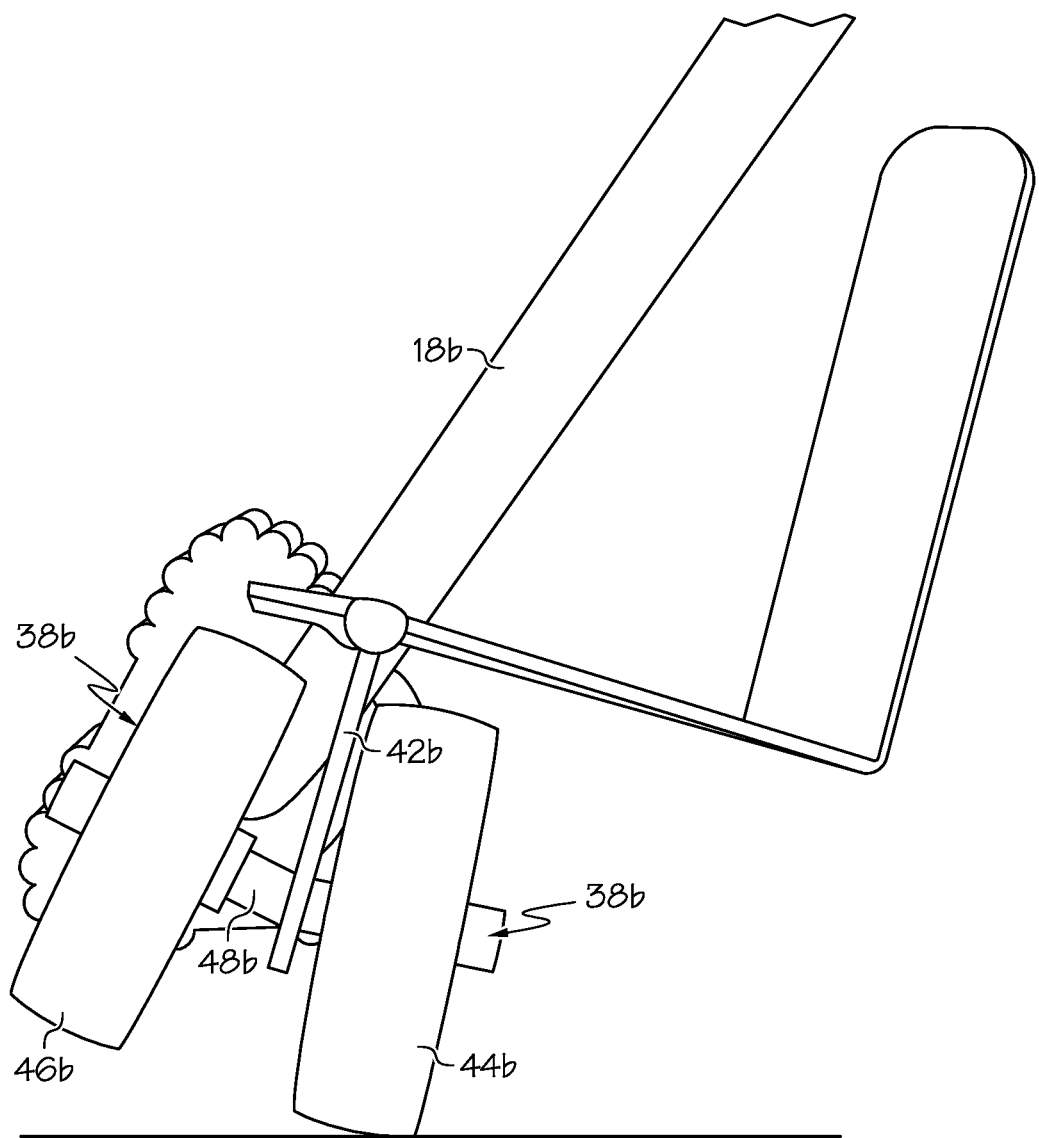
FIG. 8 is a close up rear view of the wheel assembly of the chocking device of FIG. 1 with the device in the open condition.
Figure 9:
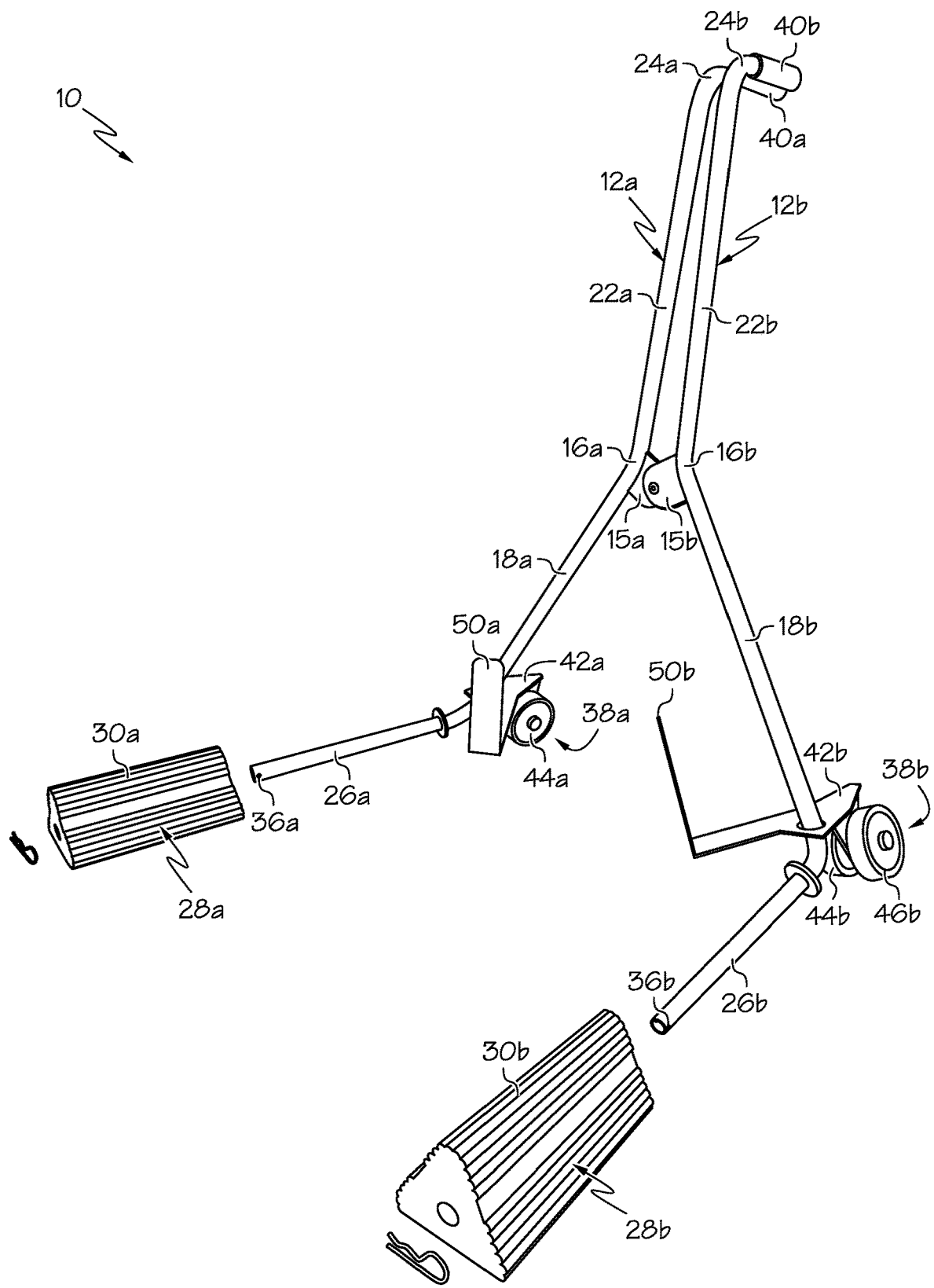
FIG. 9 is another front perspective view of the chocking device of FIG. 1 with the device being in the open condition and each chocking member removed from its respective engagement with the device.
Figure 10:
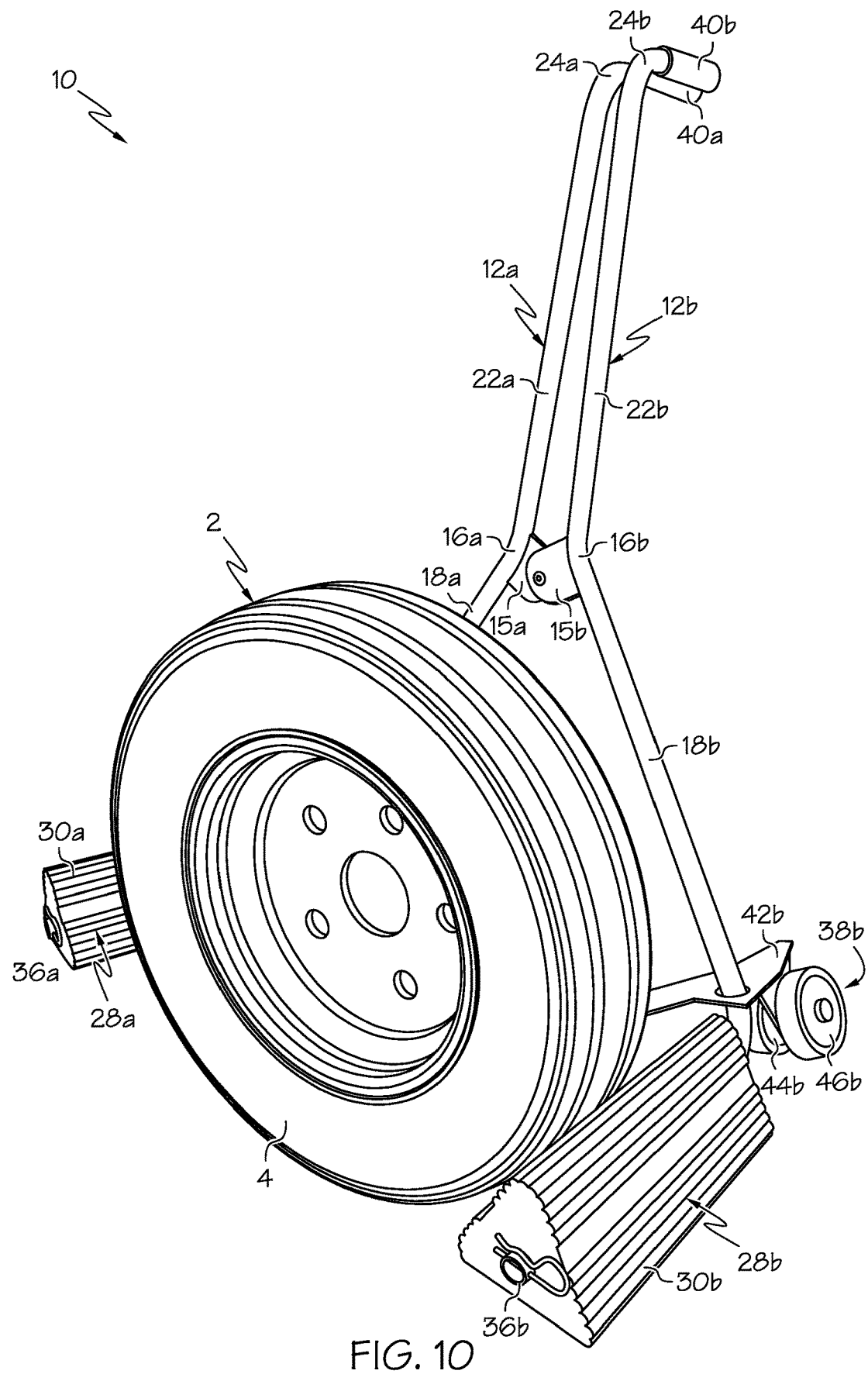
FIG. 10 is a perspective view schematically illustrating one general use of the chocking device of FIG. 1 with a tire.

FIGS. 1-10 illustrate an exemplary embodiment of a chocking device of the invention which is designated hereinafter by the reference numeral 10. For convenience sake, independent corresponding parts are referred to by a reference number and letter, such as part 1a and part 1b, and collectively as parts 1a,b. Chocking device 10 includes an arm 12a and an arm 12b which are pivotally connected to one another at an engagement 14 formed at an intermediate position 16a and 16b of each arm 12a,b, defining a lower elongated portion 18a having a lower end 20a and an upper elongated portion 22a having an upper end 24a. Similarly, intermediate position 16b of engagement 14 defines on arm 12b a lower elongated portion 18b having a lower end 20b and an upper elongated portion 22b having an upper end 24b. Engagement 14 enables a pivoting action of arms 12a,b between a closed condition wherein lower ends 20a,b are adjacent to one another as shown particularly in FIG. 2, and an open condition wherein lower ends 20a,b are furthest apart from one another as shown particularly in FIG. 5. In this embodiment, engagement 14 includes two opposing projections 15a,b and a fastener 17 forming the pivot point of engagement 14 and chocking device 10. In this embodiment, arms 12a, 12b are elongated and with an inner bow or otherwise arcuate shape between upper portion 22a,b and lower portions 18a,b at intermediate positions 16a,b.

An elongated shank 26a extends from lower end 20a transversely with respect to the axis formed by lower portion 18a. An elongated shank 26b extends from lower end 20b transversely with respect to the axis formed by lower portion 18b. Each shank 26a,b retains a chocking member 28a,b thereon. While the chocking member may be any shape, form or size, in this embodiment, each chocking member 28a,b has a support body 30a,b having a generally triangular cross-section and a bore 32a,b extending longitudinally through body 30a,b. Shanks 26a,b are dimensioned to be inserted through bore 32a,b of chocking members 28a,b and then securely retained on shanks 26a,b by flanges 33a,b and a pin 34a,b inserted into a hole adjacent the respective ends 36a,b of shanks 26a,b. It should be understood that other mechanisms for securing chocking members 28a,b on shanks 26a,b may be employed within the scope of this invention.

A wheel assembly 38a and a wheel assembly 38b which along with handles 40a,b connected to upper ends 24a,b facilitate the movement of chocking device 10. Each wheel assembly 38a,b is connected to a top plate and bracket 42a,b extending from each lower portion 18a,b.

In this embodiment, wheel assemblies 38a,b include an inner wheels 44a,b and outer wheels 46a,b. Each set of inner wheels 44a,b and outer wheels 46a,b are mounted on an axle 48a,b supported by bracket 42a,b in a spaced relationship which is either laterally fixed in, or capable of sufficient lateral movement to form, an angular relationship with respect to one another. In other words, the inner wheels 44a,b and outer wheels 46a,b are not parallel to one another. The lateral positioning of the inner and outer wheels 44a,b and 46a,b with respect to one another is shown particularly in FIG. 8. Top plate and bracket 42a,b includes a guide bar 50a,b which extends upwardly in the direction of chocking members 28a,b.

Handles 40a,b facilitate both moving device 10 to a desired location and pivoting arms 12a,b into a condition in or between the open and closed conditions. The angular mounted inner and outer wheels 44a,b and 46a,b enable one or both inner wheel 44a,b and/or outer wheels 46a,b to contact a surface which facilitates rolling device 10 to the desired location and in any condition. Thus, when in use, device 10 with chocking members 28a,b secured on shanks 26a,b can be moved to a location adjacent to a tire, such as the exemplary tire 2 with guide bars 50a,b facilitating placement of chocking members 28a,b through contact with the side wall 4 of tire 2. Retaining pins 34a,b may then be removed so that chocking members 28a,b remaining in place at tire 2. Device 10 may then be removed and possibly reused with additional chocking members (not shown). When chocking members 28a,b are to be removed, device 10 is rolled to the location in a condition such that shanks 28a,b can be inserted into bores 32a,b of chocking members 28a,b, respectively. Pins 34a,b can then be used to secure chocking members 28a,b before device 10 is rolled out of the location with chocking member 28a,b.

A chocking device of the invention, such as device 10, may be constructed out of a variety of materials, including metals such as aluminum or steel and plastics. Chocking members of the invention, such as members 28a,b may be constructed of a variety of materials as well, and may be solid or hollow, and weighted. Chocking member may be constructed, fully or partially covered by a resilient material that has a high coefficient of friction for the application, such as a rubber or rubber-like material.

It will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the invention disclosed herein as set forth in the following claims.

The invention claimed is:

1. A wheel chock system, comprising:
   first and second cooperating members each having a first and second end, wherein
   the first and second cooperating members are pivotally connected to one another at a connection point disposed between the first and second ends of each of the first and second cooperating members for permitting at least one of the first or second cooperating members to pivotally move about the connection point, the pivotal movement being throughout a range between a completely open position wherein the second ends of the first and second cooperating members are spaced apart from each other, and a completely closed position wherein the second ends of the first and second cooperating members are spaced closer to one another;

first and second wheel chocks;

first and second elongated members configured to retain said first and second wheel chocks respectively adjacent to the second ends of the first and second cooperating members respectively;

a first wheel fastened to the second end of the first cooperating member, the first wheel being moveably engageable with a work surface;

a second wheel fastened to the second end of the second cooperating member, the second wheel being moveably engageable with the work surface simultaneously with the first wheel;

a third wheel fastened to the second end of the first cooperating member, the third wheel wheel being moveably engageable with a work surface; and a fourth wheel fastened to the second end of the second cooperating member, fourth wheel being moveably engageable with the work surface simultaneously with the third wheel.

2. The wheel chock system of claim 1, wherein the first and second wheels are engageable with the work surface at a range of positions between the completely open position and completely closed position that differs from the range of positions wherein the third and fourth wheels are engageable with the work surface.

3. The wheel chock system of claim 1, further comprising first and second handles on the first ends of the first and second cooperating members respectively.

4. The wheel chock system of claim 3, wherein the first and second handles are integral with the first ends of the first and second cooperating members respectively.

5. The wheel chock system of claim 1, wherein the first and second elongated members comprise: comprises:

first and second shanks joined to the second ends of first and second cooperating members respectively, said first and second shanks being engageable to first and second cavities defined in the first and second wheel chocks respectively.

6. The wheel chock system of claim 5, wherein each of the engagements of the first and second shanks with the first and second wheel chocks further comprise:

a hole defined in each of the first and second shanks respectively for receiving at least one cotter pin.

7. The wheel chock system of claim 5, wherein the first and second shanks are integral with each of the second ends of the first and second cooperating members respectively.

8. The wheel chock system of claim 1, wherein at least one of the first or second wheel chocks are detachable from the respective first and second elongated member.

9. The wheel chock system of claim 1, wherein the pivotal connection at the connection point of the first and second cooperating members comprises:

overlapping at least first and second protrusions integral with first and second cooperating member respectively, said at least first and second protrusions defining first and second eyelets respectively; and a connector receivable by first and second eyelets.

10. A method of using a wheel chock system, comprising the steps of:

connecting first and second cooperating members each having a first and second ends via a connector permitting at least one of the first and second cooperating members to pivotally move about the connection point;

engaging first and second wheel chocks to first and second shanks respectively at second ends of first and second cooperating members;

placing the wheel chock system to dispose the first and second wheel chock proximal to opposing rounded sides of a rollable object;

actuating first and second handles on first ends of first and second cooperating members respectively so as to close second ends of respective first and second cooperating members thereby bringing the second ends closer together while engaging opposing rounded sides of the rollable object; and re-actuating first and second handles so as to open second ends of respective first and second cooperating members thereby disengaging the opposing rounded sides of the rollable object.

11. The method of using the wheel chock system of claim 10, further comprising the step of:

detaching at least one of the first or second wheel chocks from their shank.

12. The method of using the wheel chock system of claim 10 wherein the step of placing the wheel chock comprises using a rolling means.

13. The method of using the wheel chock system of claim 12, further comprising the steps of:

tilting the wheel chock system relative to a work surface until the wheel chock system is substantially supported by the rolling means thereby raising the first and second wheel chocks off a work surface; and untilting the wheel chock system thereby lowering the first and second wheel chocks onto said work surface.

14. A chocking device, comprising:

a first arm and a second arm, the first arm and the second arm each having a lower end and an upper end coupled for pivotal motion relative to one another at a coupling position between the lower end and the upper end, whereby the arms are pivotally movable in and between an open condition and a closed condition;

a first shank and a second shank extending transversely from the lower end of the first and the second arms, respectively, the first and second shanks including a non-permanent chock engagement;

a first wheel assembly and a second wheel assembly respectively connected to the first and second arms between each respective lower end and the coupling position, wherein each of the first and second wheel assembly includes an inner wheel and an outer wheel mounted laterally on an axle, wherein the mounting on the axle enables one or both the inner wheel and the outer wheel to contact a surface when the arms are in and between the open condition and the closed condition; and at least one chock body having a bore for receiving one of the first and the second shank therein, the chock body having a triangular cross-section.

15. A chocking device as recited in claim 14, further comprising:

a first handle and a second handle defined on the upper ends of the first and second arms, respectively.

16. A chocking device as recited in claim 14, further comprising:

a contact surface extending transversely from the arm between the wheel set and the coupling position.

17. A wheel chock system, comprising:

first and second cooperating members each having a first and second end, wherein the first and second cooperating members are pivotally connected to one another at a connection point disposed between the first and second ends of each of the first and second cooperating members for permitting at least one of the first or second cooperating members to pivotally move about the connection point, the pivotal movement being throughout a range between a completely open position wherein the second ends of the first and second cooperating members are spaced apart from each other, and a completely closed position wherein the second ends of the first and second cooperating members are spaced closer to one another;

first and second wheel chocks;

first and second elongated members configured to retain said first and second wheel chocks respectively adjacent to the second ends of the first and second cooperating members respectively; and first and second handles on the first ends of the first and second cooperating members, respectively.

* * * * *